(12) United States Patent
Wu

(10) Patent No.: US 7,286,472 B2
(45) Date of Patent: Oct. 23, 2007

(54) TRANSMISSION EFFICIENCY DETERMINATION

(75) Inventor: Raymond Wu, Oberscherli (CH)

(73) Assignee: Ascom (Schweiz) AG, Bern (CH)

( * ) Notice: Subject to any disclaimer, the term of this patent is extended or adjusted under 35 U.S.C. 154(b) by 994 days.

(21) Appl. No.: 10/191,532

(22) Filed: Jul. 10, 2002

(65) Prior Publication Data

US 2003/0016739 A1   Jan. 23, 2003

(30) Foreign Application Priority Data

Jul. 12, 2001   (EP)   ................................ 01810695

(51) Int. Cl.
*H04L 12/26*   (2006.01)
(52) U.S. Cl. ..................................... 370/230; 370/252
(58) Field of Classification Search ................ 370/230, 370/252
See application file for complete search history.

(56) References Cited

U.S. PATENT DOCUMENTS

| | | | | |
|---|---|---|---|---|
| 5,719,859 | A * | 2/1998 | Kobayashi et al. | ......... 370/347 |
| 6,272,112 | B1 * | 8/2001 | Orita | .......................... 370/243 |
| 6,845,100 | B1 * | 1/2005 | Rinne | .................... 370/395.43 |
| 6,888,796 | B2 * | 5/2005 | Iizuka | ........................ 370/232 |

FOREIGN PATENT DOCUMENTS

EP   0 849 912 A2   6/1998

OTHER PUBLICATIONS

Antonopoulos et al., Computers and Communications, 1997. Proceedings., Second IEEE Symposium on Alexandria, Egypt Jul. 1-3, 1997, pp. 666-670.
IEEE Colloquium UMTS—The R & D Challenges (Ref. No. 1998/496), IEEE Colloquium UMTS—The R & D Challenges, London, UK, Nov. 23, 1998 pp. 4/1-7.
Abu El-Ata et al., 17th National Radio Science Conference, XP010377263, p. 3, Column 23-34.

* cited by examiner

*Primary Examiner*—Brian Nguyen
(74) *Attorney, Agent, or Firm*—Birch, Stewart, Kolasch & Birch, LLP

(57) ABSTRACT

To determine the transmission efficiency of a data communication network in order to raise the data throughput, the transmission-time, that means the time actually used for user data transmission, is determined. By building the ratio of the transmission-time and the duration of the respective user data transfer session the network operator can measure the transmission efficiency. Depending on the transmission efficiency he then can improve the data throughput by either raising the transmission efficiency or by adding more transmission capacity.

12 Claims, 1 Drawing Sheet

TRANSMISSION EFFICIENCY DETERMINATION

BACKGROUND OF THE INVENTION

1. Field of the Invention

The invention relates to a process and a device for a determination of a transmission efficiency of a communication network for data transmission.

2. Description of the Related Art

In circuit switched data transmission networks, the subscriber has sole access to the transmission capacity allocated to him, and he pays for them accordingly. Recent cellular networks, instead of using circuit switched technology, begin to deploy packet technologies where the transmission capacity is shared by many subscribers, and a subscriber normally pays only for the part of capacity he actually used, e.g., the number of bytes he actually transmitted.

The advantage of packet technology is transmission efficiency. When one subscriber does not have anything to transmit, the capacity can be used to transmit other subscribers' data.

While there are systems available which measure the user data throughput, which is presented as a value of x kilo bits per second throughput, there exist no systems or processes for determination of the transmission efficiency and/or which indicate whether the throughput can actually be further improved.

SUMMARY OF THE INVENTION

It is therefore an object of the present invention to provide a process of the aforementioned kind which enables the determination of the transmission efficiency of a data communication network.

According to one aspect of the invention, the process for determination of the transmission efficiency of a communication network for data transmission involves the determination of the actual transmission time, that means the period of time a user actually can use to transmit user data.

Knowing the times when data transmission is available or not available immediately indicates to the network operator how efficient the network is and how he can raise the user data throughput. If the transmission efficiency is nearly 100%, then the user data throughput can be improved by adding transmission capacity, and not by trying to raise the transmission efficiency. On the other hand if the transmission efficiency is low, then data throughput can be raised by trying to raise the transmission efficiency.

According to the invention, the device for determination of a transmission efficiency of a communication network for data transmission is connected to a communication device such as a handy or a handy with test equipment features. It comprises means for determination of a transmission-time as an amount of time actually used to transmit user data.

From the following detailed description and from all the claims as a whole it will be clear to a person skilled in the art, that there exist more advantageous embodiments and combinations of characteristics of the invention.

BRIEF DESCRIPTION OF THE DRAWINGS

The drawing used for illustration of the examples shows.

DETAILED DESCRIPTION OF THE INVENTION

Figure 1:
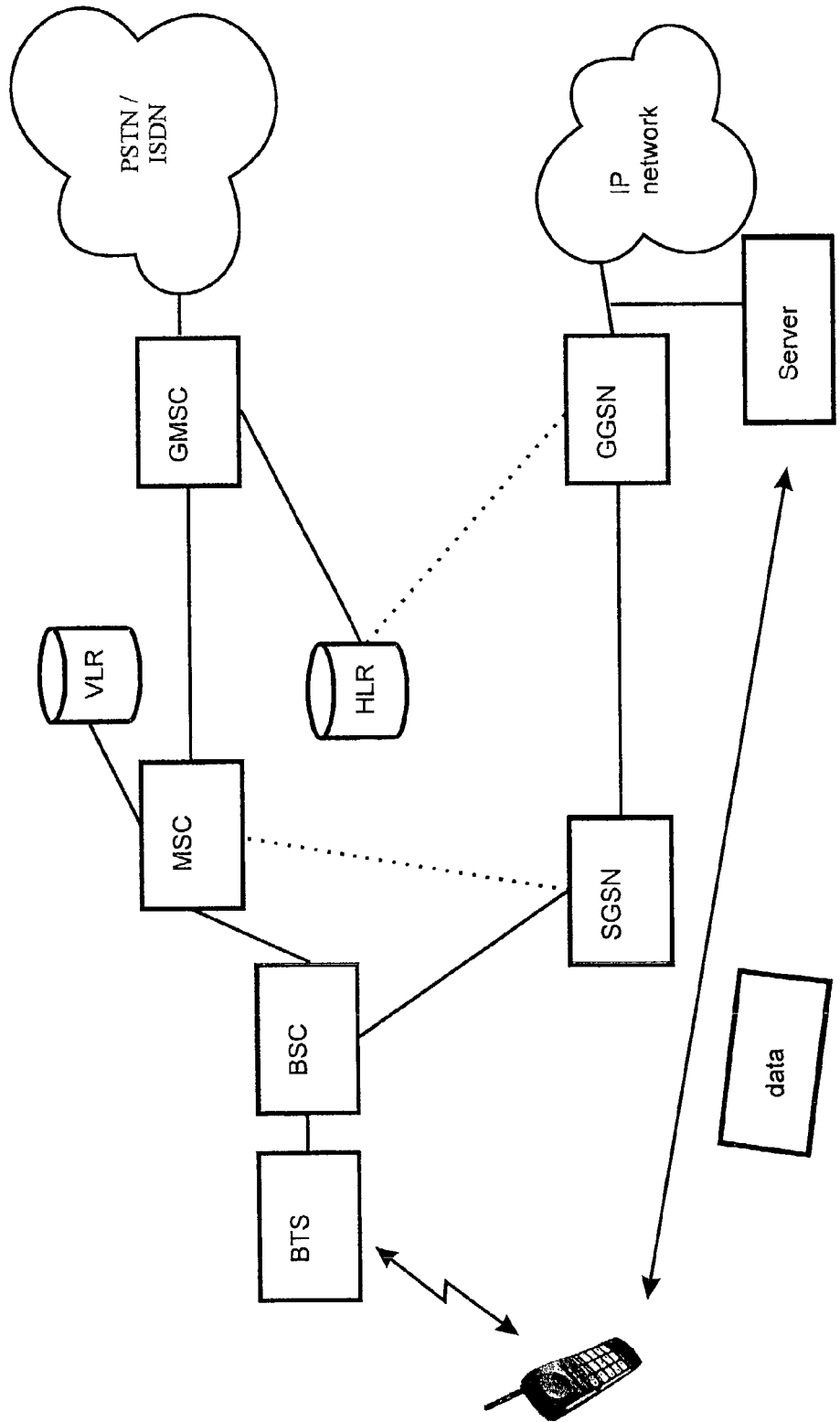
FIG. 1 shows a schematic diagram of a GPRS network.

Recent cellular networks, instead of using circuit switched technology, begin to deploy packet technologies. These network include GPRS, cdma200 1x, cdma200 1 xEV, etc.

Therefore, it is important for the cellular network operator (and also for the subscribers) that the network capacity is organized in a flexible and efficient manner so that the advantage of the packet transmission can be realized in practice.

The efficiency of the transmission depends on many factors. Take for example a GPRS network shown in FIG. 1. The abbreviations used in FIG. 1 mean:

| | |
|---|---|
| GPRS | general packet radio service |
| BTS | base station |
| BSC | base station controller |
| MSC | mobile service switching center |
| HLR | home location register |
| VLR | visitor location register |
| GMSC | gateway mobile service switching center |
| SGSN | serving GPRS support node |
| GGSN | gateway GPRS support node |
| WCDMA wideband | CDMA (wideband code division multiple access) |
| IP network | Internet protocol network (e.g. public internet) |
| PSTN/ISDN | telephony network |
| Server | a computer where information is stored. The information can be accessed by authorised persons/computer |

Data is transmitted from the communication device, such as a handy or a handy with test equipment features, to the server. Interference in the air interface (between handy and base station BTS) will require re-transmission of corrupted data hence lower data throughput. Poor data handling in the support nodes SGSN (serving GPRS support node) and GGSN (gateway GPRS support node) means lower throughput and congestion.

Despite the technical complexities, the overriding aim is to raise the transmission efficiency so that as much time as possible is used to transmit user data, and as little time is used as possible for other (network internal) purposes like signaling to organize the transmission, time taken to handover a subscriber from one cell to another, etc.

The invention therefore provides a system to measure the amount of time actually used to transmit user data in a cellular network during a user data transfer session, and the amount of time when the user data cannot be transmitted.

The system can carry out this measurement by, for example, having a central control unit connected to a subscriber handy (or handy with test equipment features). The control unit can read from this handy the times when actual transmission capacity is available from the network. In case of GSM technology, for example, this will mean the times when one or more time slots are allocated to the handy.

The system monitors the actual transmission capacity allocation at all times during a data transfer session, so that the times when no capacity is allocated is also recorded.

Whenever user data is ready for transmission, the system will monitor the availability/non-availability of transmission capacity, and calculates an availability ratio.

The goal of mobile data transmission is to raise the user data throughput to its possible maximum. Knowing the times when data transmission is available/not available for use immediately indicates to the network operator where he should look for improvements. If nearly 100% of the time is actually used for data transmission, then the user data throughput can be improved by adding transmission capacity, and not by trying to raise the transmission efficiency.

If, however, the network only gives the user data a small amount of time for transmission, and frequently asks the user to hold the data while it is busy doing internal tasks, then improvement efforts should be concentrated on reducing the times consumed by these internal tasks.

The invention claimed is:

1. A method of determining a transmission efficiency of a communication network for data transmission, comprising:
   monitoring an actual transmission capacity allocation during a data transfer session through which user data is ready for transmission;
   determining a transmission-time by determining an amount of time actually used to transmit the user data; and
   determining an availability ratio of the transmission-time to a duration of the user data transfer session to increase data throughput based on the determined availability ratio.

2. The method according to claim 1, wherein a non-transmission-time is determined as an amount of time which cannot be used to transmit user data.

3. The method according to claim 2, wherein the transmission-time and the non-transmission-time are determined by monitoring a transmission capacity actually available to a user.

4. The method according to claim 2, wherein the transmission-time and the non-transmission-time are determined during said user data transfer session, through which user data is ready for transmission.

5. The method in any one of claims 1-4, wherein the user data is transmitted based on a packet transmission technology where the user data is transmitted within a plurality of data packets.

6. The process according to claim 5, wherein the transmission efficiency of a cellular mobile radio network, particularly a GPRS (general packet radio service) network, is determined.

7. The method in any one of claims 1-4, wherein the transmission efficiency of a cellular mobile radio network, particularly a GPRS (general packet radio service) network, is determined.

8. The process according to claim 7, wherein the transmission-time and a non-transmission time are determined by monitoring an allocation of timeslots to a user.

9. A device for a determination of a transmission efficiency of a communication network for data transmission, wherein the device is connected to a communication device, the device comprising:
   means for monitoring an actual transmission capacity allocation during a data transfer session through which user data is ready for transmission;
   means for determining a transmission-time by determining an amount of time actually used to transmit the user data with the communication device; and
   means for determining an availability ratio of the transmission-time to a duration of the user data transfer session to increase data throughput based on the determined availability ratio.

10. The device according to claim 9, further comprising:
    means for determining a non-transmission-time as an amount of time which cannot be used to transmit user data by the communication device.

11. The device according to claim 9, further comprising:
    means for determining the transmission-time and a non-transmission-time during a user data transfer session, through which user data is ready for transmission.

12. The device according to claim 9, wherein the device is connected to a mobile phone or a mobile phone with test equipment features.

* * * * *